United States Patent
Kaiser et al.

(10) Patent No.: US 9,506,370 B1
(45) Date of Patent: Nov. 29, 2016

(54) GENERATOR SYSTEM

(71) Applicant: LIGHTNING MASTER CORPORATION, Clearwater, FL (US)

(72) Inventors: Bruce A. Kaiser, Clearwater, FL (US); Bryon D. Hodges, Trumbull, CT (US); James R. Oldham, Dunedin, FL (US)

(73) Assignee: TAZMAN TUBINZ, INC., Clearwater, FL (US)

( * ) Notice: Subject to any disclaimer, the term of this patent is extended or adjusted under 35 U.S.C. 154(b) by 0 days.

(21) Appl. No.: 14/966,868

(22) Filed: Dec. 11, 2015

(51) Int. Cl.
| | |
|---|---|
| H02K 7/10 | (2006.01) |
| F01D 15/10 | (2006.01) |
| F03B 13/10 | (2006.01) |
| F03B 3/12 | (2006.01) |
| F01D 5/12 | (2006.01) |
| F01D 25/24 | (2006.01) |
| H02K 7/08 | (2006.01) |
| H02K 3/28 | (2006.01) |
| H02K 11/04 | (2016.01) |
| H02K 7/18 | (2006.01) |

(52) U.S. Cl.
CPC ............. *F01D 15/10* (2013.01); *F01D 5/12* (2013.01); *F01D 25/24* (2013.01); *F03B 3/121* (2013.01); *F03B 13/10* (2013.01); *H02K 3/28* (2013.01); *H02K 7/083* (2013.01); *H02K 7/1823* (2013.01); *H02K 11/046* (2013.01); *F05D 2220/30* (2013.01); *F05D 2240/24* (2013.01); *F05D 2260/40* (2013.01)

(58) Field of Classification Search
CPC ...................................................... H02K 7/10
USPC ........................................................ 290/54
See application file for complete search history.

(56) References Cited

U.S. PATENT DOCUMENTS

| | | | | |
|---|---|---|---|---|
| 2,436,683 | A * | 2/1948 | Wood, Jr ............... | H02K 5/128 290/43 |
| 4,740,711 | A * | 4/1988 | Sato ...................... | F01B 13/061 290/52 |
| 6,011,334 | A * | 1/2000 | Roland .................... | H02K 7/11 290/43 |
| 7,102,249 | B2 * | 9/2006 | Wobben .................. | F03B 13/10 290/40 C |
| 8,294,290 | B2 * | 10/2012 | da Silva ................ | F03B 13/105 290/52 |
| 2015/0145257 | A1 * | 5/2015 | Hendricks ............... | F01D 15/10 290/52 |
| 2015/0345260 | A1 * | 12/2015 | Green ................ | E21B 41/0085 310/68 R |

FOREIGN PATENT DOCUMENTS

CA            2352673 A1 *  1/2003    ............. B63H 11/08

\* cited by examiner

*Primary Examiner* — Joseph Waks
(74) *Attorney, Agent, or Firm* — Buskop Law Group, PC; Wendy Buskop

(57) ABSTRACT

A generator system fluidly connected between a first preexisting pipe and a second preexisting pipe comprising a generator with a first preexisting pipe flange and a second preexisting pipe flange, without forming any holes in the first and second preexisting pipes. A first and second generator flange for engaging a non-magnetic section of pipe and the preexisting pipes and a plurality of coils secured to the non-magnetic section of pipe. A plurality of rare earth magnets secured to an outer surface of a rotating drum or a propeller and configured to energize the plurality of coils. At least one radial bearing, a thrust bearing and a junction box electrically connected to the plurality of coils for receiving energy produced by the plurality of coils and for transmitting a current.

17 Claims, 6 Drawing Sheets

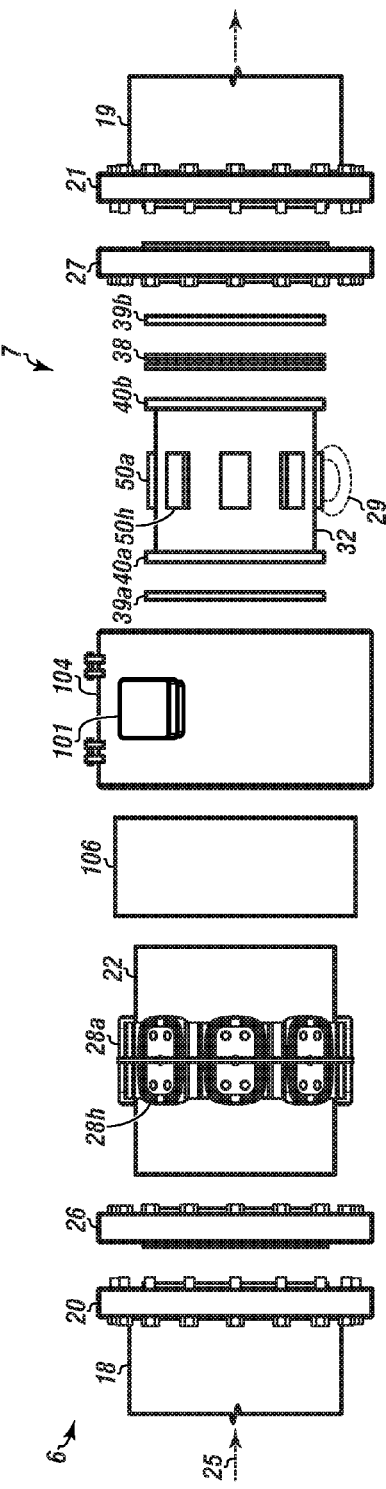
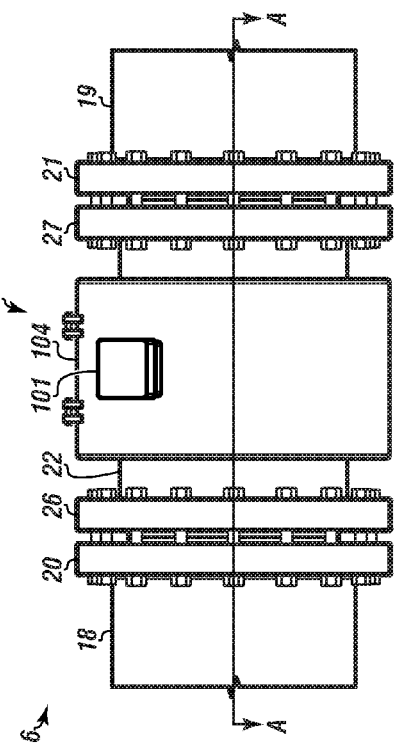
FIGURE 1A
FIGURE 1B

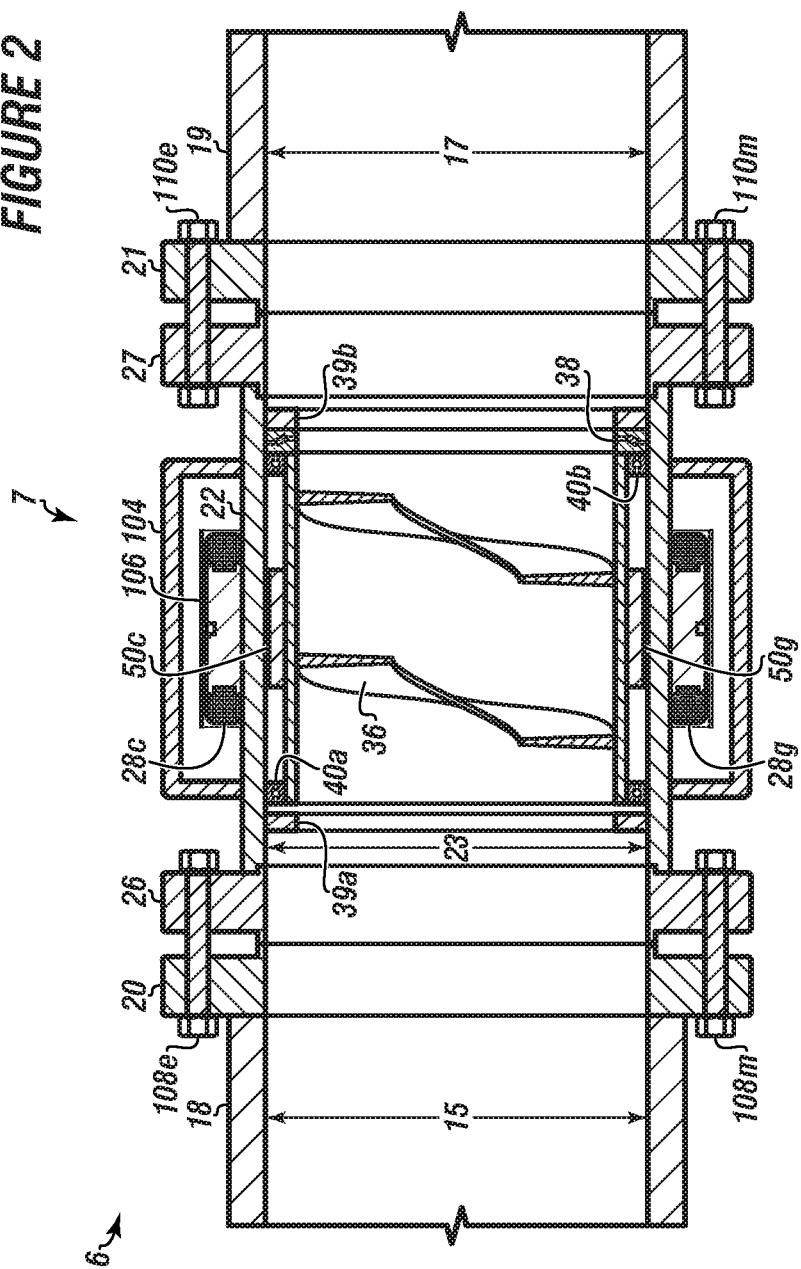

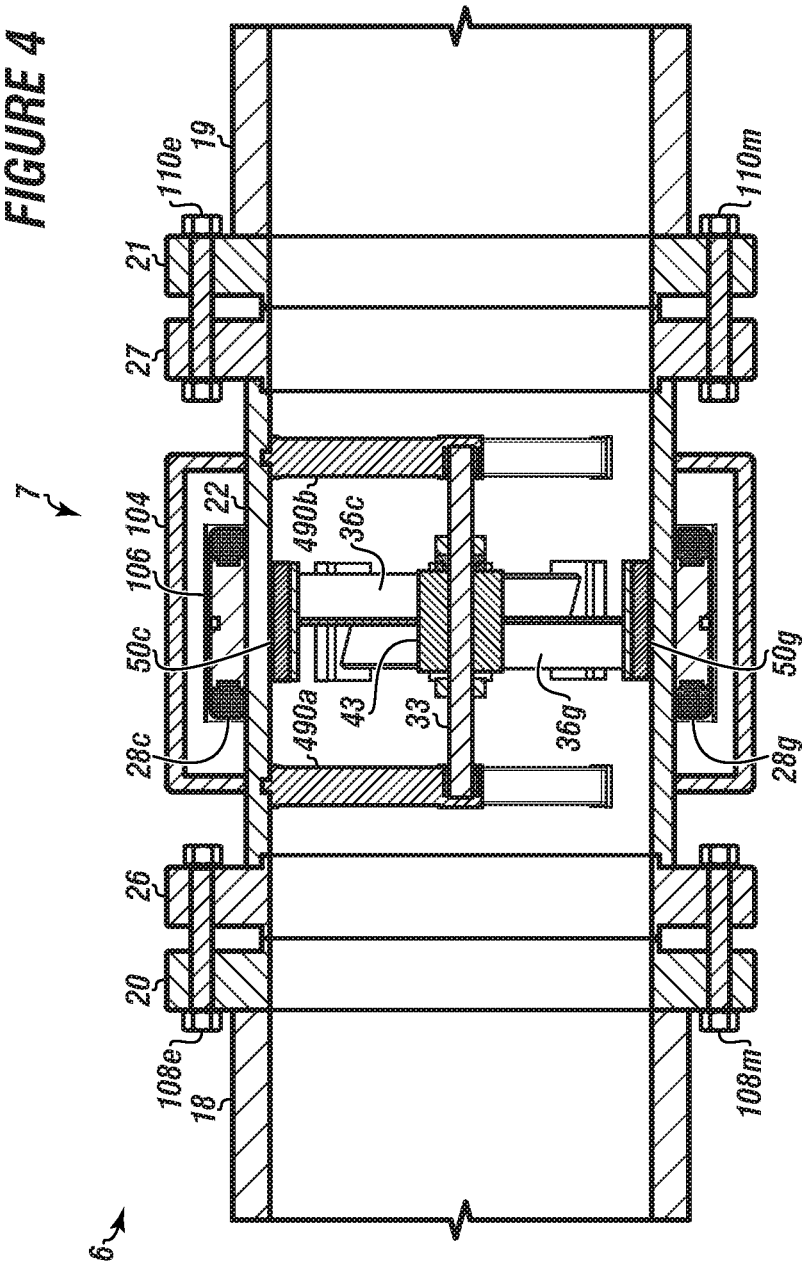

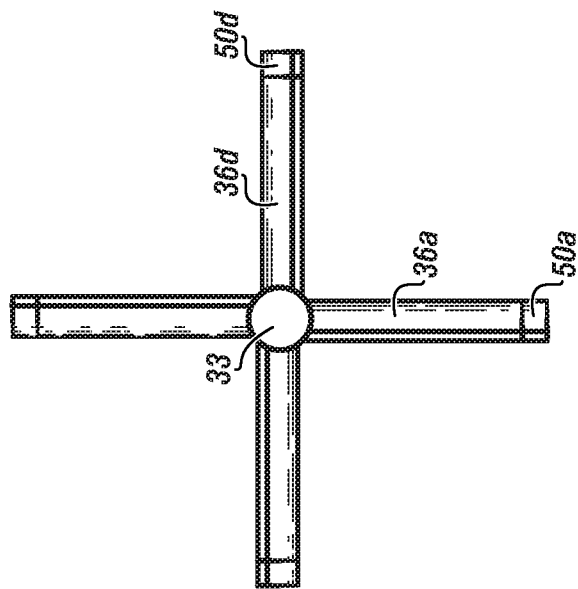
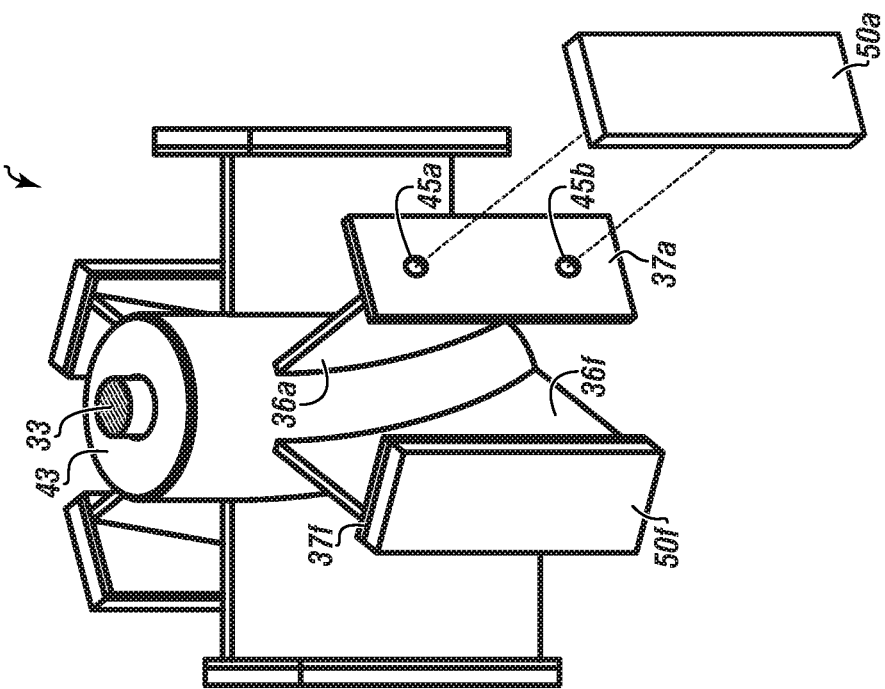

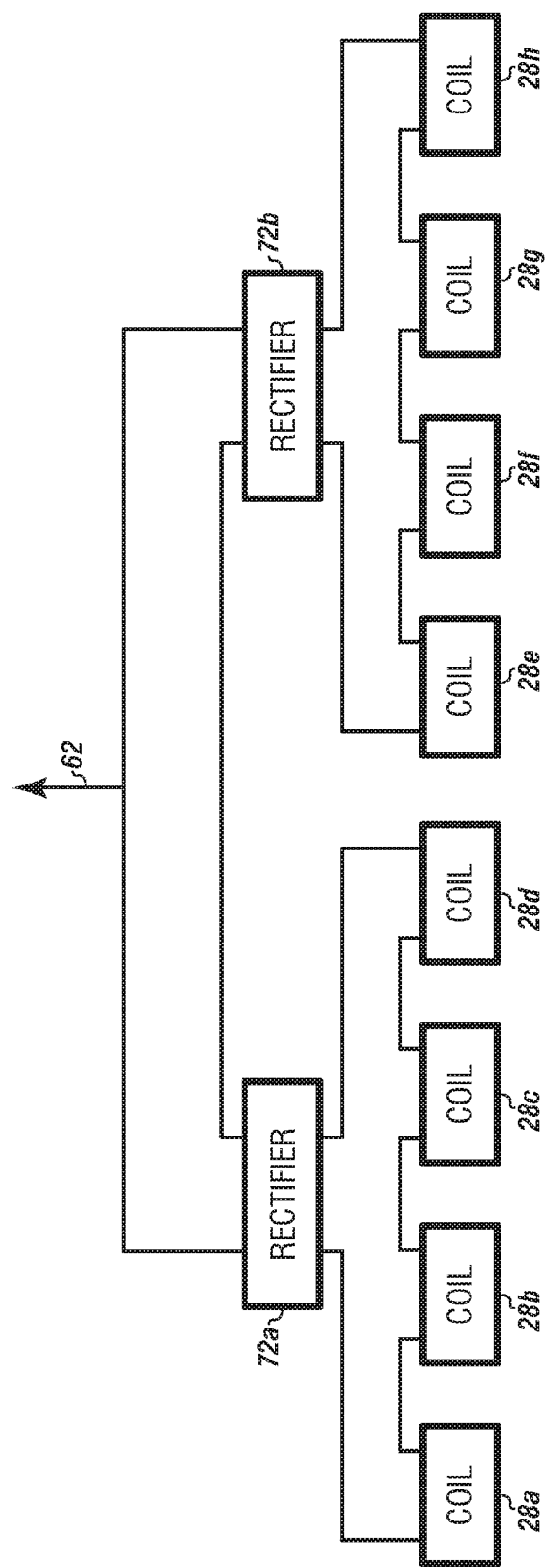

GENERATOR SYSTEM

FIELD

The present embodiments generally relate to an in-pipe combustion-free generator system for producing electrical current.

BACKGROUND

A need exists for an in-pipe generator system for producing current using momentum of a fluid in a fluid pipe.

A need exists for an in-pipe generator system for a pipeline that requires no holes be created in the preexisting sections of pipe for leak tight integrity during operation.

The present embodiments meet these needs.

BRIEF DESCRIPTION OF THE DRAWINGS

The detailed description will be better understood in conjunction with the accompanying drawings as follows:

FIG. 1A is an exploded view of a generator system according to one or more embodiments.

FIG. 1B is an assembled view of the generator system according to one or more embodiments.

FIG. 2 is a cross sectional view of the generator system of FIG. 1B cut along line A-A.

FIG. 4 is a cross sectional view of the generator system of FIG. 3B cut along line B-B.

FIG. 5 is a detail of a rotating magnetic propeller usable with the generator system according to one or more embodiments.

FIG. 6 is another detail of a rotating magnetic propeller usable with the generator system according to one or more embodiments.

FIG. 7 depicts a diagram of the generator system with rectifiers for converting current.

Figure 3A:
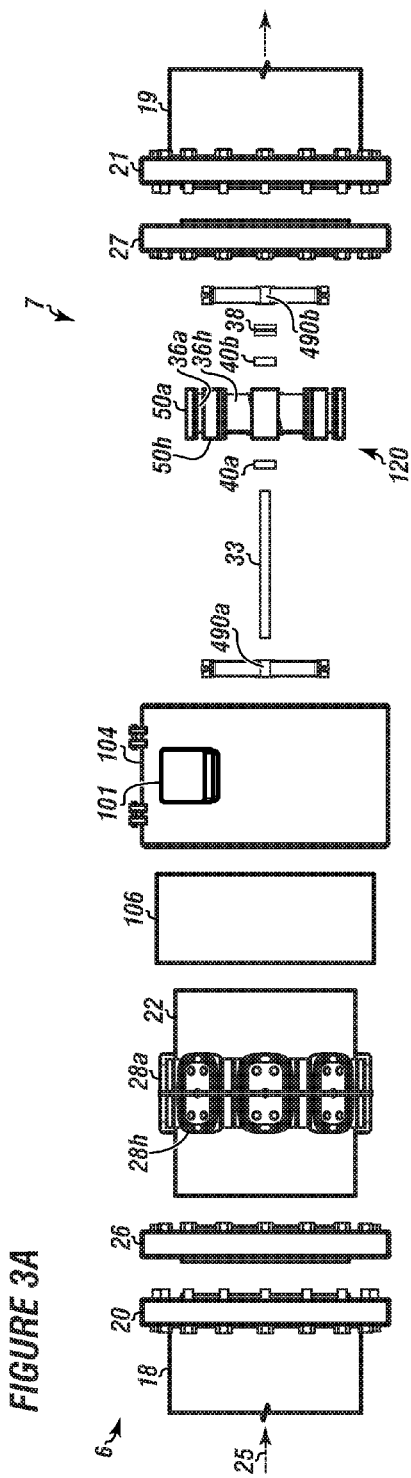
FIG. 3A is an exploded view of the generator system according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present embodiments generally relate to an in-pipe generator system for producing current using momentum of a fluid in a fluid pipe.

The in-pipe generator system requires no holes to be created in the preexisting sections of pipe for a leak tight integrity during operation.

The generator system can also be specifically designed to prevent electrocution of persons inadvertently. The generator system provides low voltage, producing from 6 voltages to 48 voltages. The generator system can further be configured to provide sufficient energy to operate a supervisory control and data acquisition system.

The invention can prevent death because the generator system does not interrupt the integrity of the existing pipeline.

The invention can prevent explosions because the generator system does not allow electrical activity to take place when hydrocarbons, oxygen or other volatile gases or liquids are present.

The invention can prevent environmental disasters because the generator system provides a method of generating electricity at remote sites without producing pollutants.

The invention can prevent fires because the generator system does not use combustion and does not compromise the integrity of the existing pipeline.

The generator system can also produce sufficient energy to run site lighting for personal safety and security systems, such as remote cameras.

In embodiments, the generator system can also be used to charge cellular phones and other electronic devices.

The generator system can be used to charge utility batteries, such as batteries in a fork lift or a vehicle, such as an airplane that has been parked for an extended length of time.

In embodiments, the generator system can be monitored by a supervisory control and data acquisition system to view energy output.

In embodiments, multiple generators can be connected together as a generator system.

In embodiments, multiple generators can be simultaneously monitored to provide variable power to a central location. The multiple generators can be connected in series for control of voltage and in parallel for control of current.

The term "angled blades" as used herein can be made from stainless steel and cannot be cutting devices, but angled blades which can rotate around a central core with a function to propel the magnets of the generator system around in a circle. The angled blades can be aerodynamically shaped to maximize thrust from fluid flowing through the turbine. In embodiments, the angled blades can be in the shape of a propeller blade.

The term "angular contact bearing" as used herein can refer to a type of mechanical, anti-friction device that supports a load in both radial and thrust capacity.

The term "fluid" as used herein can refer to flowing particulate, flowing fluid, flowing gas or combinations thereof. The fluid can be at least one of: water, hydrocarbons, flowing particulate, chlorine, carbon dioxide or other entrained gas in a fluid.

The term "magnetic flux" as used herein can refer to an amount of magnetic energy moving past a conductor.

The term "pipeline flanges" as used herein can refer to connectors that can connect around the outside of an existing pipeline for specifically joining the non-magnetic section of pipe to the existing pipeline without creating holes of any kind in the existing pipeline.

The term "plurality of coils" as used herein can refer to at least 2 and up to 36 coils positioned around the non-magnetic section of pipe, each coil can have an iron core with a fixed number of windings of wire, such as copper, of a particular size. The wire is insulated. The plurality of coils can be connected in series, in parallel or combinations thereof.

The term "bearing" as used herein can support load from the push of the gas against the angled blades, the bearings can allow the angled blades to spin freely in a translational manner and support the rotational load. In embodiments, the first bearing, the second bearing, or both the first and second bearings can be angular contact bearings or radial bearings with thrust bearings.

The term "rare earth magnets" as used herein can refer to neodymium and other rare earth materials that create magnets. In embodiments, rare earth magnets can have a variety of shapes but generally have a dimension ranging from 0.5 inch to 2 inches. In embodiments, each rare earth magnet can generate from 3000 gauss to 24,000 gauss. In embodiments, each rare earth magnet can have an aerodynamic shape, such as the shape of an airfoil.

The term "rectifier" as used herein can refer to a device that changes AC current to DC current.

The term "solid rotating shaft" as used herein can refer to a length of hardened and ground material, such as 316 stainless steel or CF8M material.

The term "thrust bearing" as used herein can be a bearing that can support load in the direction of a horizontal thrust.

In embodiments, each generator without a rectifier of the generator system can produce from 200 watts to 1000 watts of 12 volts to 48 volts of three phase AC current.

Turning now to the Figures, FIG. 1A is an exploded view of the generator system according to one or more embodiments.

The generator system 6 has a generator 7, which can be fluidly connected between a first preexisting pipe 18 and a second preexisting pipe 19 for flowing fluid 25.

The first preexisting pipe 18 can have a first preexisting pipe inner diameter 15 and the second preexisting pipe 19 can have a second preexisting pipe inner diameter 17. The inner diameters are shown in FIG. 2.

The fluid can be a liquid, a liquid and gas, a liquid with particulate, a gas with particulate or a liquid and gas with particulate. In embodiments, the gas can be natural gas. The natural gas can be received by the generator system at the same pressure as the natural gas well is producing without deforming the generator.

In embodiments, the fluid can be a flowable very fine particulate.

In embodiments, hydrocarbon fluids, water, wine, and chemical fluids can be used in the generator system.

The generator 7 can include a first preexisting pipe flange 20 and a second preexisting pipe flange 21.

A first generator flange 26 can engage a non-magnetic section of pipe 22 and the first preexisting pipe flange 20 without forming any holes in the non-magnetic section of pipe.

In embodiments, the first generator flange can simultaneously engage the non-magnetic section of pipe and the first preexisting pipe flange. The first preexisting pipe flange can be welded to the first preexisting pipe in an embodiment.

A second generator flange 27 can engage the non-magnetic section of pipe 22 and the second preexisting pipe flange 21 without forming any holes in the non-magnetic section of pipe.

In embodiments, the second generator flange can simultaneously engage the non-magnetic section of pipe and the second preexisting pipe flange. The second preexisting pipe flange can be welded to the second preexisting pipe in an embodiment The generator system 6 can include a plurality of coils 28a-28h, which can be circumferentially secured to a non-magnetic section of pipe 22 for generating current when energized by a plurality of rotating magnetic flux, each magnetic flux generated by a rare earth magnet of a plurality of rare earth magnets 50a-50h.

In embodiments, the generator system can use from 2 coils to 36 coils per generator.

In embodiments, the generator system can use from 50 windings to 500 windings per coil of the plurality of coils.

The generator system can include a rotating drum 32, which can be mounted within the non-magnetic section of pipe 22.

In embodiments, the rotating drum 32 can extend longitudinally within the non-magnetic section of pipe 22. The non-magnetic pipe can be 2 feet long or any length desired by a customer. The rotating drum can have a length shorter than the non-magnetic section pipe.

The plurality of rare earth magnets 50a-50h can be circumferentially secured to the rotating drum 32, such as mounted to extend through the surface of the rotating drum.

The plurality of rare earth magnets can be configured to energize the plurality of coils 28a-28h.

A first bearing 40b can be positioned in the non-magnetic section of pipe at a downstream location to the rotating drum 32.

In embodiments, the first bearing 40b can be an angular contact bearing or a radial bearing with a thrust bearing 38.

In embodiments, a second bearing 40a can be positioned in the non-magnetic section of pipe at an upstream location to the rotating drum. In embodiments, the second bearing can be a radial bearing.

A pair of annular rings 39a and 39b can be mounted to the non-magnetic section of pipe 22 and can be configured to contain the radial bearing 40a and the at least one first bearing 40b and the rotating drum 32 within the non-magnetic section of pipe 22.

The pair of annular rings 39a and 39b can each be configured with an aerodynamic shape to optimize gas flow through the generator;

In embodiments, the pair of annular rings 39a and 39b can have a diameter slightly smaller than the inner diameter of the non-magnetic section of pipe.

The thrust bearing 38 can be positioned between one of the annular rings and one of the bearings at a downstream location of the rotating drum.

A junction box 101 can be electrically connected to the plurality of coils 28a-28h for receiving energy produced by the plurality of coils and for transmitting current.

It should be noted that FIGS. 1A and 1B show the moving fluid 25 flowing into the preexisting pipe through the first preexisting pipe 18 towards the second preexisting pipe 19. The moving fluid causes the plurality of angled blades of the rotating drum to spin, turning the rotating drum.

As the rotating drum spins, a magnetic flux can be provided by each of the rare earth magnets attached to the rotating drum. In embodiments the rare earth magnets can be "counter-sunk" into the rotating drum, optimizing the distance from the inside of the non-magnetic section of pipe. The magnetic flux can energize the plurality of coils mounted on the non-magnetic section of pipe.

The plurality of coils can be energized for generating current of sufficient energy to produce at least 200 watts continuously.

An outer housing 104 can be configured to surround the plurality of coils 28a-28h of the non-magnetic section of pipe 22 between the first generator flange 26 and the second generator flange 27.

In embodiments, a sleeve 106 can be mounted in the non-magnetic section of pipe 22 to redirect the magnetic flux 29.

In embodiments, the sleeve 106 can be a thin piece of metal with a thickness from 1/16 of an inch to 1/4 of an inch to focus and concentrate the plurality of magnetic flux.

FIG. 1B is an assembled view of the generator system according to one or more embodiments.

The generator system 6 is shown with the generator 7, which can be fluidly connected between the first preexisting pipe 18 and the second preexisting pipe 19.

The first preexisting pipe flange 20 can be mounted to the first preexisting pipe 18 without forming any holes in the first preexisting pipe, such as by welding.

The second preexisting pipe flange 21 can engage the second preexisting pipe without forming any holes in the second preexisting pipe, such as by welding.

The first generator flange 26 can engage the non-magnetic section of pipe 22 and the first preexisting pipe flange 20 without forming any holes in the non-magnetic section of pipe.

The second generator flange 27 can engage the non-magnetic section of pipe 22 and the second preexisting pipe flange 21 without forming any holes in the non-magnetic section of pipe.

The outer housing 104 is shown surrounding the plurality of coils of the non-magnetic section of pipe between the first generator flange 26 and the second generator flange 27.

The junction box 101 can be electrically connected to the plurality of coils for receiving energy produced by the plurality of coils and transmitting current.

FIG. 2 is a cross sectional view of the generator system of FIG. 1B cut along line A-A.

The generator system 6 is shown with the generator 7 connected fluidly between the first preexisting pipe 18 and the second preexisting pipe 19.

The first preexisting pipe flange 20 can be connected to the first generator flange 26 using a first plurality of fasteners 108e-108m.

The non-magnetic section of pipe 22 is shown having a non-magnetic section of pipe inner diameter 23. In embodiments, the non-magnetic section of pipe inner diameter can be identical to a first preexisting pipe inner diameter 15 and a second preexisting pipe inner diameter 17.

The second preexisting pipe flange 21 can be connected to the second generator flange 27 using a second plurality of fasteners 110e-110m.

Two of the plurality of coils 28c and 28g are shown. The coils of the plurality of coils can be circumferentially secured on the non-magnetic section of pipe 22 for generating current when energized by magnetic flux produced by each of the plurality of rare earth magnets 50c and 50g.

The rotating drum 32 can have a plurality of angled blades 36.

The first bearing 40b can be positioned in the non-magnetic section of pipe at a downstream location to the rotating drum 32.

The second bearing 40a can be positioned in the non-magnetic section of pipe at an upstream location to the rotating drum 32.

The pair of annular rings 39a and 39b are shown mounted to the non-magnetic section of pipe 22, which can be configured for containing the first bearing 40b and the rotating drum within the non-magnetic section of pipe.

The thrust bearing 38 can be positioned between one of the annular rings and one of the radial bearings at a downstream location to the rotating drum.

The outer housing 104 is shown and can be configured to surround the plurality of coils of the non-magnetic section of pipe and the sleeve 106 mounted in the non-magnetic section of pipe to redirect the magnetic flux.

In embodiments, the non-magnetic section of pipe can be at least one of: a non-ferrous metal, a composite, or a ceramic configured to sustain up to 2100 psi without deforming.

In embodiments, each of the plurality of angled blades can be curved aerodynamically.

FIG. 3A is an exploded view of the generator system according to one or more embodiments.

In this embodiment, the generator system 6 shows the generator 7 fluidly connected between the first preexisting pipe 18 and the second preexisting pipe 19 for flowing fluid 25.

The generator 7 can include the first preexisting pipe flange 20 and the second preexisting pipe flange 21.

The first generator flange 26 can engage the non-magnetic section of pipe 22 and the first preexisting pipe flange 20 without forming any holes in the non-magnetic section of pipe, such as by welding.

The second generator flange 27 can engage the non-magnetic section of pipe 22 and the second preexisting pipe flange 21 without forming any holes in the non-magnetic section of pipe, such as by welding.

The plurality of coils 28a-28h can be circumferentially secured on the non-magnetic section of pipe 22 for generating current when energized by magnetic flux from the plurality of rare earth magnets.

In this embodiment, a rotating magnetic propeller 120 can be mounted within the non-magnetic section of pipe 22.

The rotating magnetic propeller 120 can have a solid rotating shaft 33, which can longitudinally extend within the non-magnetic section of pipe.

The rotating magnetic propeller can contain the plurality of angled blades 36a-36h, which can pivotably surround the solid rotating shaft 33.

The plurality of angled blades can extend to be proximate to the non-magnetic section of pipe without touching the non-magnetic section of pipe.

Each rare earth magnet of the plurality of rare earth magnets 50a-50h can be installed on each of the plurality of angled blades 36a-36h at a location close to the non-magnetic section of pipe without touching the non-magnetic section of pipe.

In embodiment, the plurality of rare earth magnets can be configured to energize the plurality of coils.

A pair of bearing support structures 490a and 490b can be mounted on either side of the rotating magnetic propeller 120.

The first bearing 40b can be positioned in the non-magnetic section of pipe at a downstream location to the rotating magnetic propeller.

The second bearing 40a can be positioned in the non-magnetic section of pipe at an upstream location to the rotating magnetic propeller.

The thrust bearing 38 can be positioned between the first bearing 40b and at least one of the bearing support structures 490b.

The junction box 101 is shown electrically connected to the plurality of coils for receiving energy produced by the plurality of coils and transmitting a current 62 shown in FIG. 7.

In this embodiment, the fluid 25 flows through the first preexisting pipe 18 towards the second preexisting pipe 19 causing the plurality of angled blades to rotate generating the magnetic flux and energizing the plurality of coils which in turn generate current of sufficient energy to produce at least 200 watts continuously.

Also shown is the outer housing 104, which can be configured to surround the plurality of coils of the non-magnetic section of pipe between the first generator flange 26 and the second generator flange 27.

The sleeve 106 is shown mounted in the non-magnetic section of pipe to redirect the magnetic flux.

Figure 3B:
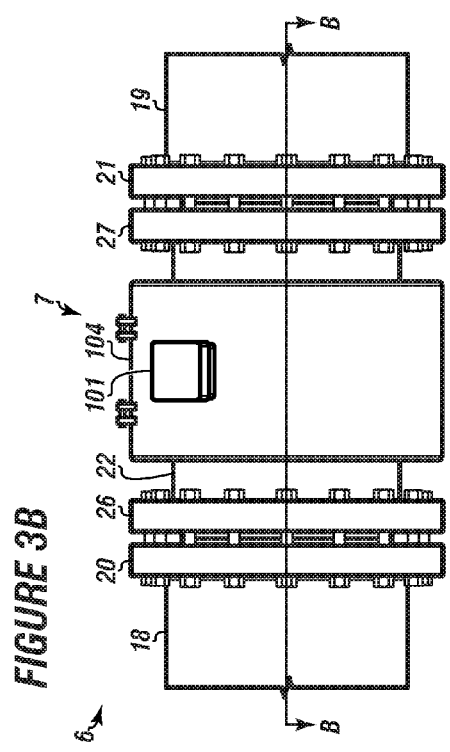
FIG. 3B is an assembled view of the generator system according to one or more embodiments.

FIG. 3B is an assembled view of the generator system according to one or more embodiments.

The generator system 6 is shown with the generator 7, which can be connected between the first preexisting pipe 18 and the second preexisting pipe 19.

The first preexisting pipe flange 20 is shown mounted to the first preexisting pipe 18 without forming any holes in the first preexisting pipe.

The second preexisting pipe flange 21 is shown engaging the second preexisting pipe without forming any holes in the second preexisting pipe.

The non-magnetic section of pipe 22 is depicted.

The first generator flange 26 is shown engaging simultaneously the non-magnetic section of pipe 22 and the first preexisting pipe flange 20 without forming any holes in the non-magnetic section of pipe.

The second generator flange 27 is shown engaging simultaneously the non-magnetic section of pipe 22 and the second preexisting pipe flange 21 without forming any holes in the non-magnetic section of pipe.

The outer housing 104 is shown between the first generator flange 26 and the second generator flange 27.

The junction box 101 is shown electrically connected to the plurality of coils for receiving energy produced by the plurality of coils and transmitting a current.

FIG. 4 is a cross sectional view of the generator system of FIG. 3B cut along line B-B.

The generator system 6 is shown with the generator 7 connected fluidly between the first preexisting pipe 18 and the second preexisting pipe 19.

The first preexisting pipe flange 20 can be connected to the first generator flange 26 using the first plurality of fasteners 108e-108m.

The second preexisting pipe flange 21 can be connected to the second generator flange 27 with the second plurality of fasteners 110e-110m.

The outer housing 104, the sleeve 106, the non-magnetic section of pipe 22, and two of the plurality of coils 28c and 28g are shown.

Each rare earth magnet of the plurality of rare earth magnets 50c and 50g can be installed on each of the plurality of angled blades 36c and 36g at a location close to the non-magnetic section of pipe without touching the non-magnetic section of pipe.

A blade mount 43 is also shown and can be used to mount and support the rotating magnetic propeller.

The pair of bearing support structures 490a and 490b can be mounted on either side of the solid rotating shaft 33.

The plurality of rare earth magnets can be configured to energize the plurality of coils.

In embodiments of the generator system, each of the plurality of angled blades can be curved as a propeller blade.

FIG. 5 is a detail of the rotating magnetic propeller usable with the generator system according to one or more embodiments.

A rotating magnetic propeller 120 is shown with the solid rotating shaft 33 and the blade mount 43.

The plurality of angled blades 36a-36f are shown pivotably surrounding the solid rotating shaft.

The plurality of angled blades 36a-36f can connect to the blade mount 43 and the blade mount can rotate around the solid rotating shaft 33.

In this embodiment, each of the plurality of angled blades 36a-36f can have a magnet seat 37a-37f. Each magnet seat is for supporting at least one of the plurality of rare earth magnets 50a-50f without disturbing fluid flow passing the plurality of angled blades.

In embodiments, each magnet seat 37a-37f can have screw holes 45a and 45b, which can be used for securing at least one of the pluralities of rare earth magnets to at least one of the plurality of angled blades.

In this embodiment, the magnetic rotating propeller can have from 2 coils to 36 coils per generator system.

In embodiments, each of the plurality of coils can use from 50 windings to 500 windings per coil.

FIG. 6 is another detail of a rotating magnetic propeller usable with the generator system according to one or more embodiments.

The rotating magnetic propeller is shown with the solid rotating shaft 33 and the plurality of angled blades 36a-36d pivotably surrounding the solid rotating shaft.

In this embodiment, the plurality of rare earth magnets 50a-50d can be secured to the plurality of angled blades 36a-36d, without the use of the magnet seats.

FIG. 7 depicts at least one rectifier for converting current usable with the generator system according to one or more embodiments.

At least one rectifier 72a and 72b can be connected between the plurality of coils 28a-28h and a load for converting the current 62 from AC current to DC current.

While these embodiments have been described with emphasis on the embodiments, it should be understood that within the scope of the appended claims, the embodiments might be practiced other than as specifically described herein.

What is claimed is:

1. A generator system with a generator fluidly connected between a first preexisting pipe with a first preexisting pipe inner diameter and a second preexisting pipe with a second preexisting pipe inner diameter for flowing a fluid, the generator comprising:
   a. a first preexisting pipe flange with a first plurality of fasteners, the first preexisting pipe flange engaging the first preexisting pipe without forming any holes in the first preexisting pipe;
   b. a second preexisting pipe flange with a second plurality of fasteners, the second preexisting pipe flange engaging the second preexisting pipe without forming any holes in the second preexisting pipe;
   c. a non-magnetic section of pipe having a non-magnetic section of pipe inner diameter;
   d. a first generator flange engaging simultaneously the non-magnetic section of pipe and the first preexisting pipe flange without forming any holes in the non-magnetic section of pipe;
   e. a second generator flange engaging simultaneously the non-magnetic section of pipe and the second preexisting pipe flange without forming any holes in the non-magnetic section of pipe;
   f. a plurality of coils circumferentially secured on the non-magnetic section of pipe for generating current;
   g. a rotating drum mounted within the non-magnetic section of pipe, the rotating drum comprising a plurality of angled blades, the rotating drum longitudinally extending within the non-magnetic section of pipe;

h. a plurality of rare earth magnets circumferentially secured to the rotating drum, the plurality of rare earth magnets configured to energize the plurality of coils;

i. a first bearing positioned in the non-magnetic section of pipe at a downstream location to the rotating drum, wherein the first bearing is either an angular contact bearing or a radial bearing with a thrust bearing;

j. a second bearing positioned in the non-magnetic section of pipe at an upstream location to the rotating drum;

k. a pair of annular rings mounted to the non-magnetic section of pipe, the pair of angular rings configured for containing the at least one first bearing and the rotating drum within the non-magnetic section of pipe, each annular ring is configured with an aerodynamic shape to optimize gas flow through the generator; and l. a junction box electrically connected to the plurality of coils for receiving energy produced by the plurality of coils and transmitting the current; and wherein the fluid flows through the first preexisting pipe towards the second preexisting pipe causing the plurality of angled blades to turn the rotating drum which rotates magnetic flux energizing the plurality of coils generating the current of sufficient energy to produce at least 200 watts continuously, and further wherein a sleeve mounted in the non-magnetic section of pipe redirects the magnetic flux generated by the plurality of magnetic coils.

2. The generator system of claim 1, comprising from 2 coils to 36 coils per generator.

3. The generator system of claim 1, comprising from 50 windings to 500 windings per coil.

4. The generator system of claim 1, comprising at least one rectifier connected between the plurality of coils and a load, the at least one rectifier configured for converting the current from AC current to DC current.

5. The generator system of claim 1, wherein the non-magnetic section of pipe is at least one of: a non-ferrous metal, a composite, or a ceramic configured to sustain up to 2100 psi without deforming.

6. The generator system of claim 1, wherein each of the plurality of angled blades is curved aerodynamically.

7. The generator system of claim 1, comprising an outer housing configured to surround the plurality of coils of the non-magnetic section of pipe between the first generator flange and the second generator flange.

8. The generator system of claim 1, wherein the sleeve is a thin piece of metal with a thickness from 1/16 of an inch to 1/4 of an inch.

9. A generator system with a generator fluidly connected between a first preexisting pipe with a first preexisting pipe inner diameter and a second preexisting pipe with a second preexisting pipe inner diameter for flowing a fluid, the generator comprising:

a. a first preexisting pipe flange with a first plurality of fasteners, the first preexisting pipe flange engaging the first preexisting pipe without forming any holes in the first preexisting pipe;

b. a second preexisting pipe flange with a second plurality of fasteners, the second preexisting pipe flange engaging the second preexisting pipe without forming any holes in the second preexisting pipe;

c. a non-magnetic section of pipe having a non-magnetic section of pipe inner diameter;

d. a first generator flange engaging simultaneously the non-magnetic section of pipe and the first preexisting pipe flange without forming any holes in the non-magnetic section of pipe;

e. a second generator flange engaging simultaneously the non-magnetic section of pipe and the second preexisting pipe flange without forming any holes in the non-magnetic section of pipe;

f. a plurality of coils circumferentially secured on the non-magnetic section of pipe for generating current;

g. a rotating magnetic propeller mounted within the non-magnetic section of pipe, the rotating magnetic propeller comprising:
   (i) a solid rotating shaft longitudinally extending within the non-magnetic section of pipe;
   (ii) plurality of angled blades pivotably surrounding the solid rotating shaft, the plurality of angled blades extending to be proximate to the non-magnetic section of pipe without touching the non-magnetic section of pipe; and
   (iii) a plurality of rare earth magnets, each of the plurality of rare earth magnets installed on each of the plurality of angled blades at a location close to the non-magnetic section of pipe without touching the non-magnetic section of pipe;

h. a pair of bearing support structures mounted on either side of the rotating magnetic propeller;

i. a first bearing positioned in the non-magnetic section of pipe at a downstream location to the rotating magnetic propeller;

j. a second bearing positioned in the non-magnetic section of pipe at an upstream location to the rotating magnetic propeller;

k. a thrust bearing positioned between the first bearing and one of the pair of bearing support structures at the downstream location to the rotating magnetic propeller; and l. a junction box electrically connected to the plurality of coils for receiving energy produced by the plurality of coils and transmitting the current; and wherein the fluid flows through the first preexisting pipe towards the second preexisting pipe causing the plurality of angled blades to rotate generated magnetic flux energizing the plurality of coils generating the current of sufficient energy to produce at least 200 watts continuously, and further wherein a sleeve mounted in the non-magnetic section of pipe redirects the magnetic flux generated by the plurality of magnetic coils.

10. The generator system of claim 9, comprising from 2 coils to 36 coils per generator.

11. The generator system of claim 9, comprising from 50 windings to 500 windings per coil.

12. The generator system of claim 9, comprising at least one rectifier connected between the plurality of coils and a load, the at least one rectifier configured for converting the current from AC current to DC current.

13. The generator system of claim 9, wherein the non-magnetic section of pipe is at least one of: a non-ferrous metal, a composite, or a ceramic configured to sustain up to 2100 psi without deforming.

14. The generator system of claim 9, wherein each of the plurality of angled blades is curved aerodynamically.

15. The generator system of claim 9, comprising an outer housing configured to surround the plurality of coils of the non-magnetic section of pipe between the first generator flange and the second generator flange.

16. The generator system of claim 9, wherein the sleeve is a thin piece of metal with a thickness from 1/16 of an inch to 1/4 of an inch.

17. The generator system of claim 9, wherein each of the plurality of angled blades comprises a magnet seat for supporting at least one of the plurality of rare earth magnets without disturbing fluid flow passing the plurality of angled blades.

* * * * *